US012686615B2

(12) United States Patent
Heary et al.

(10) Patent No.: US 12,686,615 B2
(45) Date of Patent: Jul. 21, 2026

(54) METHOD AND SYSTEM OF THERMOLYSIS BASED HYDROGEN AND OXYGEN GENERATION

(71) Applicant: Cosmic Energy Power Inc., Springville, NY (US)

(72) Inventors: William E. Heary, Union Springs, NY (US); Frederick M. Heary, Springville, NY (US); Frederick F. Heary, Springville, NY (US)

(73) Assignee: Cosmic Energy Power, Inc., Springville, NY (US)

( * ) Notice: Subject to any disclaimer, the term of this patent is extended or adjusted under 35 U.S.C. 154(b) by 830 days.

(21) Appl. No.: 18/154,809

(22) Filed: Jan. 14, 2023

(65) Prior Publication Data

US 2024/0239650 A1 Jul. 18, 2024

(51) Int. Cl.
*C01B 3/04* (2026.01)
*B01J 6/00* (2006.01)
(Continued)

(52) U.S. Cl.
CPC .............. *C01B 3/042* (2013.01); *B01J 6/008* (2013.01); *C01B 3/50* (2013.01); *C01B 13/0207* (2013.01);
(Continued)

(58) Field of Classification Search
CPC ....... C01B 3/042; C01B 3/50; C01B 13/0207; C01B 13/0248; C01B 2203/0465;
(Continued)

(56) References Cited

U.S. PATENT DOCUMENTS

| | | | | |
|---|---|---|---|---|
| 4,181,774 | A | * | 1/1980 | Wendt .................... H01S 3/034 |
| | | | | 428/335 |
| 5,886,316 | A | * | 3/1999 | Pierce .................... B01J 19/121 |
| | | | | 219/121.36 |

(Continued)

FOREIGN PATENT DOCUMENTS

| | | | |
|---|---|---|---|
| CN | 208487606 U | * | 2/2019 |
| JP | 5124728 B2 | | 1/2013 |

(Continued)

OTHER PUBLICATIONS

Machine translation of CN208487606U (Year: 2019).*

*Primary Examiner* — Xiuyu Tai
(74) *Attorney, Agent, or Firm* — Pablo Meles; GrayRobinson, PA

(57) ABSTRACT

A thermolysis based hydrogen and oxygen generator and a method of generating hydrogen and oxygen can include a high pressure pump for pumping fluid, such fluid provided for separating into at least hydrogen molecules and oxygen molecules, a high pressure, high temperature spherical vessel coupled to the high pressure pump, and one or more lasers for focusing energy in a predetermined direction towards the spherical vessel, where the one or more lasers creates heat energy and pressure in the spherical vessel sufficiently to cause the fluid in the spherical vessel to separate into hydrogen molecules and oxygen molecules. The generator can further include a power supply for powering the one or lasers and the high pressure pump, a hydrogen storage tank coupled to the spherical vessel for storing the hydrogen molecules, and an oxygen storage tank coupled to the spherical vessel for storing the oxygen molecules.

19 Claims, 5 Drawing Sheets

(51) Int. Cl.
 *C01B 3/042*   (2026.01)
 *C01B 3/50*   (2006.01)
 *C01B 13/02*   (2006.01)

(52) U.S. Cl.
 CPC .. *C01B 13/0248* (2013.01); *C01B 2203/0465* (2013.01); *C01B 2210/0009* (2013.01); *C01B 2210/0053* (2013.01)

(58) Field of Classification Search
 CPC .... C01B 2210/0009; C01B 2210/0053; C01B 3/06; C01B 3/065; C01B 2203/0415; C01B 2203/0866; C01B 2203/0855; C01B 2203/0277; C01B 2203/1017; C01B 2203/1614; B01J 6/008; B01J 19/1806; B01J 19/121; B01J 2219/12; B01J 2219/0049; B01J 2219/029; B01J 2219/0236; B01J 2219/0877; B01J 2219/00162; B01J 2219/0218; B01J 2219/08; B01J 2219/00139; B01J 2219/0879; B01J 2219/0888; B01J 2219/089; B01J 2208/00433; B01J 2208/00814; B01J 19/10; B01J 19/0013; B01J 8/0035; B01J 8/0285; B01J 8/16; F02M 21/029; F02M 21/023; F02M 21/0206; F02M 25/12; F02M 21/0227; F02M 21/0275; F02P 23/04; F02P 9/007; F03H 99/00; F02B 43/10; F02C 3/28; B63G 8/08; B63H 21/00; Y02T 50/60; Y02T 10/12; Y02T 10/30; Y02T 70/50; Y02T 90/40; Y02E 60/36; H04Q 2011/0081

See application file for complete search history.

(56)    References Cited

U.S. PATENT DOCUMENTS

| | | | |
|---|---|---|---|
| 8,216,432 B2 | 7/2012 | Brooks et al. | |
| 10,443,139 B2 | 10/2019 | Mills | |
| 11,230,776 B2 | 1/2022 | Mills | |
| 2002/0100836 A1* | 8/2002 | Hunt | B63H 21/00 |
| | | | 244/50 |
| 2003/0180587 A1 | 9/2003 | Jones et al. | |

FOREIGN PATENT DOCUMENTS

| | | | | |
|---|---|---|---|---|
| WO | 2021159117 A1 | 8/2021 | | |
| WO | WO-2023205838 A1* | 11/2023 | | C01B 3/06 |

* cited by examiner

20

25

200

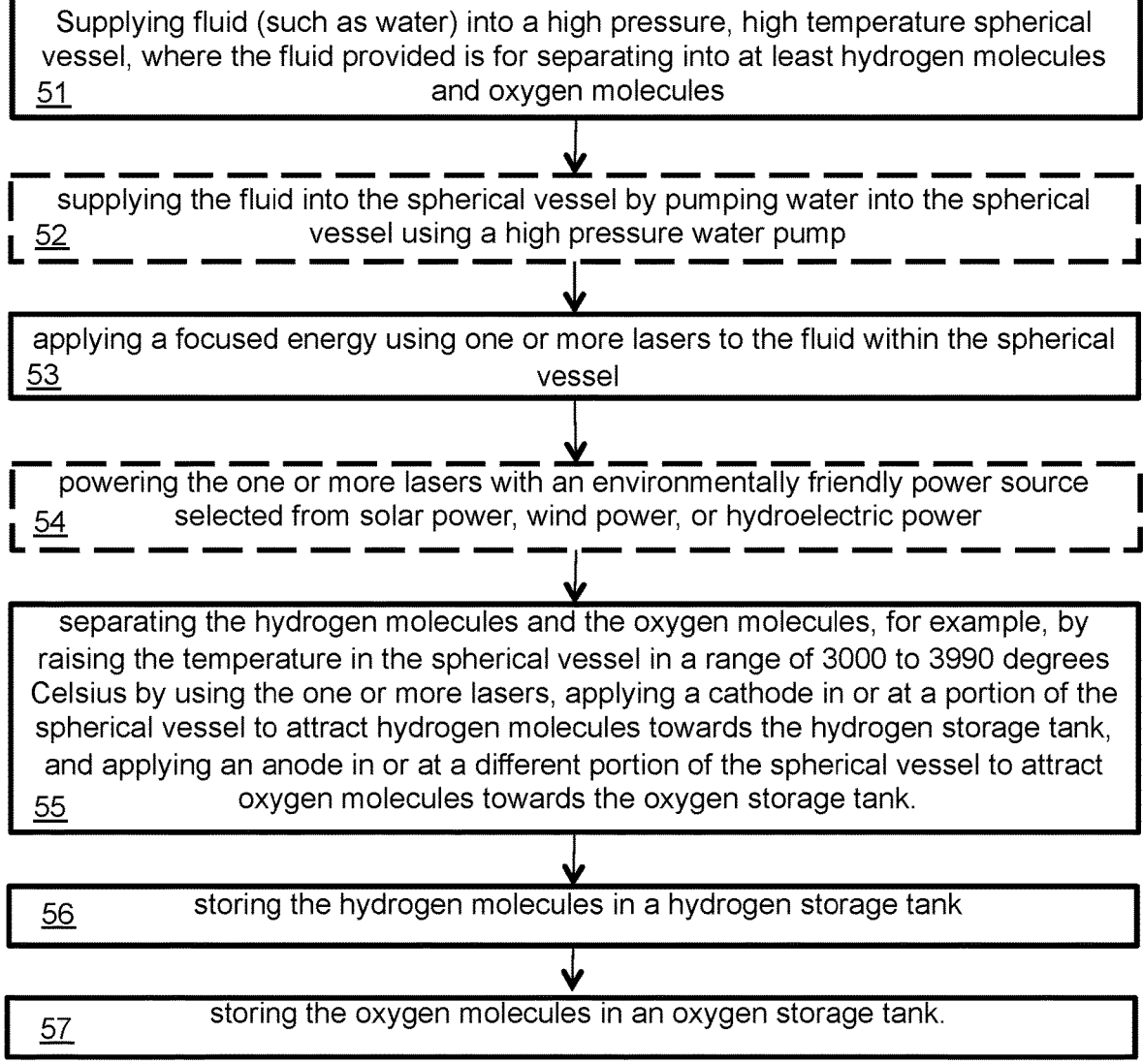

Supplying fluid (such as water) into a high pressure, high temperature spherical vessel, where the fluid provided is for separating into at least hydrogen molecules and oxygen molecules
51 supplying the fluid into the spherical vessel by pumping water into the spherical vessel using a high pressure water pump
52 applying a focused energy using one or more lasers to the fluid within the spherical vessel
53 powering the one or more lasers with an environmentally friendly power source selected from solar power, wind power, or hydroelectric power
54 separating the hydrogen molecules and the oxygen molecules, for example, by raising the temperature in the spherical vessel in a range of 3000 to 3990 degrees Celsius by using the one or more lasers, applying a cathode in or at a portion of the spherical vessel to attract hydrogen molecules towards the hydrogen storage tank, and applying an anode in or at a different portion of the spherical vessel to attract oxygen molecules towards the oxygen storage tank.
55

56     storing the hydrogen molecules in a hydrogen storage tank 57     storing the oxygen molecules in an oxygen storage tank.

METHOD AND SYSTEM OF THERMOLYSIS BASED HYDROGEN AND OXYGEN GENERATION

FIELD

The present disclosure is directed to a method and system for the separation of water into hydrogen and oxygen fuels, and more particularly to an environmentally friendly method and system of thermolysis based hydrogen and oxygen generation that can be portable or non-portable.

BACKGROUND

Current methods of fuel are largely comprised of carbon emitting fuels that have been shown to have large negative impacts on the environment. The system that is being proposed will create a fuel that will not have a carbon footprint or one that is significantly less than current power or fuel generating systems and can be widely used in the industries that require fuel for operations. Examples include, but are not limited to, electric power manufacturing facilities, transportation, agriculture, residential fuel consumption, and many others that currently rely on environmentally unfriendly carbon-based fuels.

Utilizing Hydrogen fuel instead of carbon-based fuels is clean and practical as using hydrogen as fuel is similar to that of carbon fuels with the exception that the byproducts of hydrogen fuel are heat and water. Furthermore, many existing systems for generating hydrogen fuel utilize chemicals that end up emitting gases that are environmentally unfriendly or use energy as an input that is environmentally damaging (e.g., coal-fired electricity generation).

The reaction for forming water can be demonstrated by the chemical formula:

$$2H2(g) \quad + \quad O2(g) \quad \longrightarrow \quad 2H2O(l)$$

The explanation of this chemical formula is as follows:

Two Hydrogen gas molecules combined with Two Oxygen gas molecules yields Two water molecules in liquid form.

The fuel manufacturing system that is being proposed will take water and separate it into hydrogen and oxygen which then can be used as a fuel in combustion engines and any other uses of hydrogen and oxygen.

SUMMARY

In some embodiments, a thermolysis based hydrogen and oxygen generator can include a high pressure pump for pumping fluid, such fluid provided for separating into at least hydrogen molecules and oxygen molecules, a high pressure, high temperature spherical vessel coupled to the high pressure pump, and one or more lasers for focusing energy in a predetermined direction towards the spherical vessel, where the one or more lasers creates heat energy and pressure in the spherical vessel sufficiently to cause the fluid in the spherical vessel to separate into hydrogen molecules and oxygen molecules. The generator can further include a power supply for powering the one or lasers and the high pressure pump, a hydrogen storage tank coupled to the spherical vessel for storing the hydrogen molecules, and an oxygen storage tank coupled to the spherical vessel for storing the oxygen molecules.

In some embodiments, the thermolysis based hydrogen and oxygen generator further includes a translucent window formed on a portion of the spherical vessel and a heat exchange rod within the spherical vessel that lines up through the translucent window to the focal point of the one or more lasers so as to provide a heat generation surface on the heat exchange rod.

In some embodiments, the thermolysis based hydrogen and oxygen generator further includes a rigid and pivotable framework to couple or move the spherical vessel relative to the one or more lasers enabling the spherical vessel and the one or more lasers to adjust relative to each other to cause a focal point to stay on a designated point on or within the spherical vessel.

In some embodiments, a thermolysis based hydrogen and oxygen generator can include a high pressure water pump for pumping water provided by a water supply, a check valve coupled to the high pressure water pump, a high pressure, high temperature spherical vessel coupled to the check valve, and one or more lasers for focusing energy in a predetermined direction towards the spherical vessel, where the one or more lasers creates heat energy in the spherical vessel sufficiently to cause water in the spherical vessel to separate into hydrogen molecules and oxygen molecules. The generator can further include a power supply for powering the one or lasers, a hydrogen storage tank coupled to the spherical vessel for storing the hydrogen molecules, and an oxygen storage tank coupled to the spherical vessel for storing the oxygen molecules.

In some embodiments, the thermolysis based hydrogen and oxygen generator has a spherical vessel that is a boiler tank that further includes a portion formed from one or more of Tantalum Hafnium Carbide Alloy, or Graphite in a form capable of sustaining high temperatures and high pressure, and a portion forming a transparent window of glass or other material where the one or more lasers are focused toward the portion forming the transparent window to convert a liquid or a fluid medium in the boiler tank to a gas.

In some embodiments, the spherical vessel is a boiler tank that further includes a heat exchanger rod within the boiler tank.

In some embodiments, the thermolysis hydrogen/oxygen generator is portable and self-contained and the one or more lasers are configured to be selectively and rotatably focused towards the spherical vessel.

In some embodiments, the check valve is configured and constructed to reside between the high pressure water pump and the spherical vessel.

In some embodiments, the spherical vessel includes a portion made of glass and further includes a metal heat exchange rod within the spherical vessel that lines up to at least one focal point of the one or more lasers so as to provide a heat generation surface at or through the glass portion and thereby further enhancing efficiency.

In some embodiments, the thermolysis based hydrogen and oxygen generator further includes an excessive steam release valve for the spherical vessel.

In some embodiments, the thermolysis based hydrogen and oxygen generator further includes a rigid and pivotable framework to couple the spherical vessel to the one or more lasers enabling the spherical vessel and the one or more lasers to adjust relative to each other to cause a focal point to stay on a designated point on or within the spherical vessel.

In some embodiments, the spherical vessel includes a window made of a translucent material selected from one of a translucent metal, plexiglass, or glass capable of withstanding high heat and pressure.

In some embodiments, the spherical vessel includes a window made of a translucent material made of Indium Tin Oxide.

In some embodiments, the thermolysis generator further includes an alignment system that rotates or orients the one or more lasers to ensure maximal utilization of heat energy generated by the one or more lasers.

In some embodiments, the thermolysis generator can include a window formed on a portion of the spherical vessel which includes a translucent metal material and a heat exchange rod within the spherical vessel that lines up through the window to the focal point of the laser so as to provide a heat generation surface on the heat exchange rod thereby further enhancing efficiency.

In some embodiments, the thermolysis generator can further include a processor coupled to a thermostat to control movement of the one or more lasers so as to regulate the distance between the one or more lasers and the spherical vessel, thereby regulating a temperature of a fluid in the spherical vessel.

In some embodiments, a thermolysis based hydrogen and oxygen generation method can include the steps of supplying fluid (such as water) into a high pressure, high temperature spherical vessel, where the fluid provided is for separating into at least hydrogen molecules and oxygen molecules, applying a focused energy using one or more lasers to the fluid within the spherical vessel, separating the hydrogen molecules and the oxygen molecules, storing the hydrogen molecules in a hydrogen storage tank, and storing the oxygen molecules in an oxygen storage tank.

In some embodiments, the thermolysis based hydrogen and oxygen generation method includes supplying the fluid into the spherical vessel by pumping water into the spherical vessel using a high pressure water pump.

In some embodiments, the thermolysis based hydrogen and oxygen generation method further includes powering the one or more lasers with an environmentally friendly power source selected from solar power, wind power, or hydroelectric power.

In some embodiments, the thermolysis based hydrogen and oxygen generation method separates the hydrogen molecules and the oxygen molecules by raising the temperature in the spherical vessel in a range of 3000 to 3990 degrees Celsius by using the one or more lasers, applying a cathode in or at a portion of the spherical vessel to attract hydrogen molecules towards the hydrogen storage tank, and applying an anode in or at a different portion of the spherical vessel to attract oxygen molecules towards the oxygen storage tank.

BRIEF DESCRIPTION OF DRAWINGS

FIG. 5 illustrates a flow chart of a method of thermolysis based fuel generation in accordance with the embodiments.

DETAILED DESCRIPTION

Figure 1:
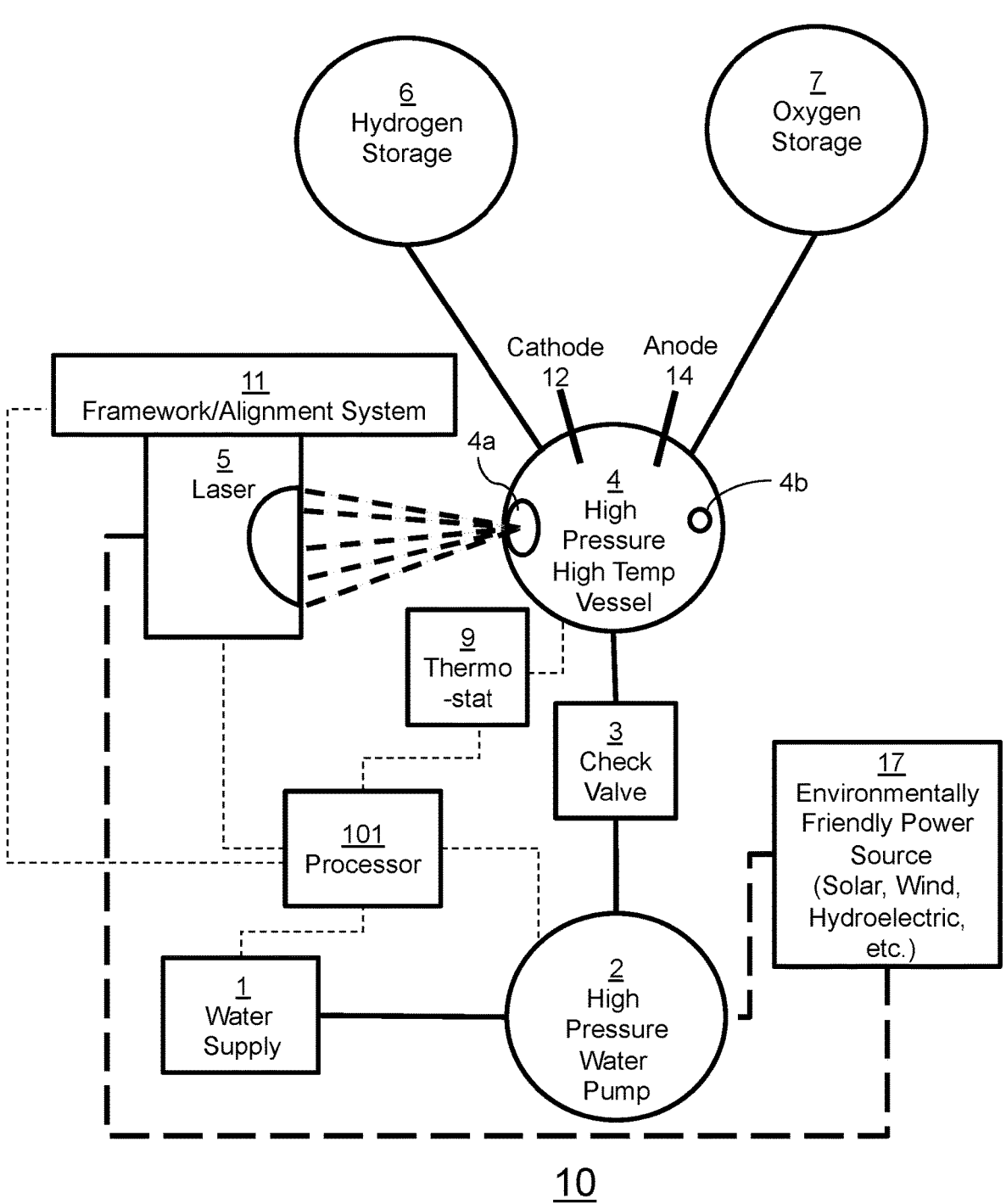
FIG. 1 illustrates a system for generating power using at least in part a thermolysis generator in accordance with the embodiments.
Figure 2:
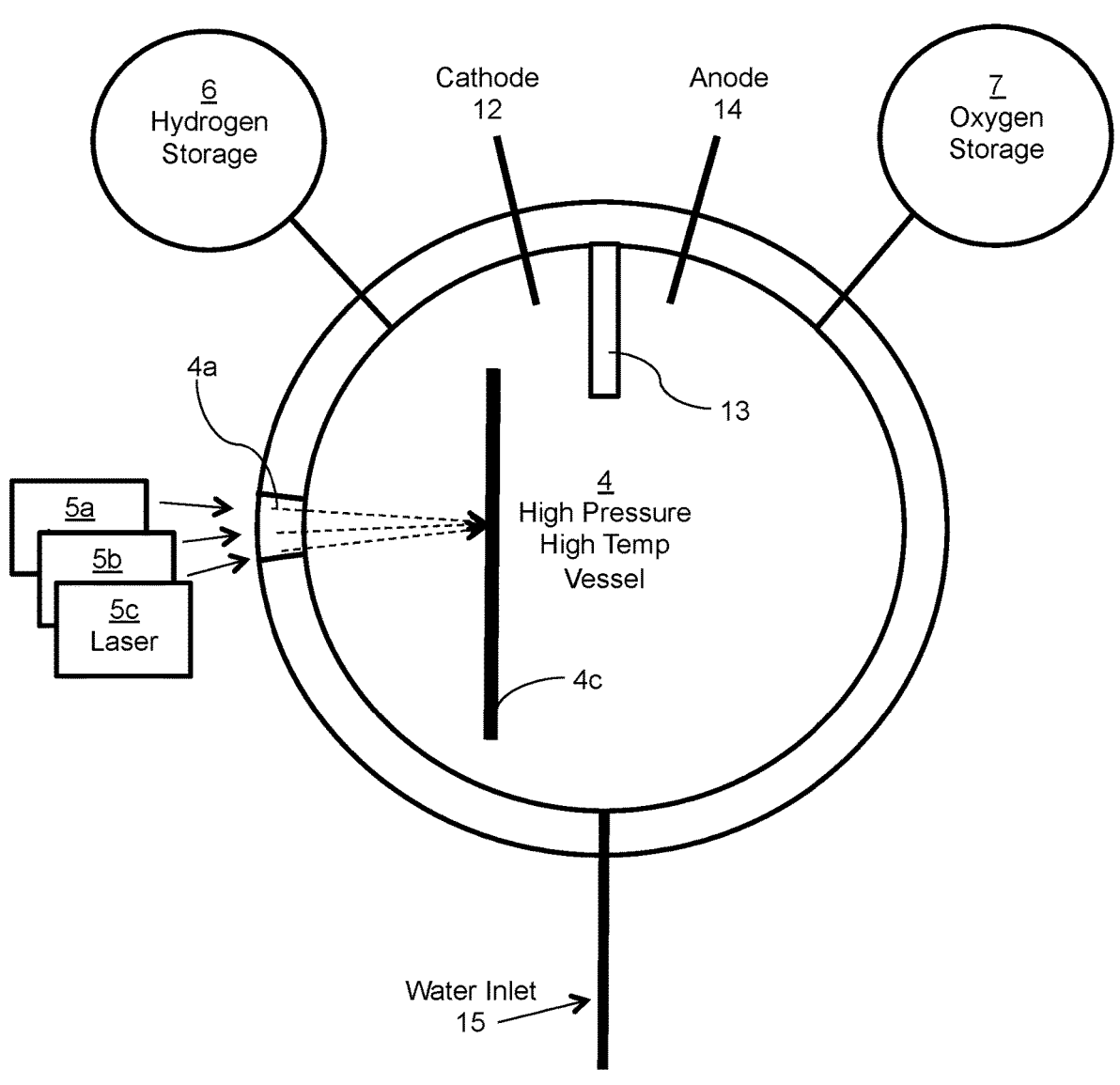
FIG. 2 illustrates another system for generating power using at least in part a thermolysis generator in accordance with the embodiments.

As illustrated in FIG. 1, a Thermolysis Hydrogen/Oxygen Generator system 10 directs electricity from an environmentally friendly power source 17 to a High Pressure water pump 2 providing power for the pump to push water from water supply 1 through check valve 3 (check valve 3 is one directional) allowing water to be directed into a high pressure, high temperature spherical vessel 4 or boiler tank. Once water or other fluid is in the spherical vessel 4, one or more lasers 5 will heat the contents of the vessel 4 causing the water to separate into hydrogen and oxygen. The one or more lasers 5 can also be powered by the environmental friendly power source 17 (e.g., solar, wind, hydroelectric, etc.). The one or more lasers 5 can be, for example, fiber lasers, and/or solid state lasers capable of producing a minimum temperature of 3000 degrees Celsius, but not exceeding 3990 degrees Celsius. A cathode 12 (having a negative charge) will attract Hydrogen having a slight positive charge while an anode 14 (having a positive charge) will attract oxygen (having a negative charge). The spherical vessel 4 can further include a divider 13 as shown in FIG. 2 within the high-pressure/high temperature vessel 4 that keeps the hydrogen and oxygen separated so that the hydrogen gas enters the hydrogen storage tank 6 while oxygen gas is directed into a separate oxygen storage tank 7. Once separated into the storage tanks, the gasses can be harvested for the utilization of carbon free fuel. The Thermolysis system 20 of FIG. 2 is similar to the system 10 of FIG. 1, but further illustrates a number of lasers 5a, 5b, and 5c that are focused on a heat exchanger rod 4c through a window 4a of the spherical vessel 4.

The spherical vessel 4 can come in various dimensions or sizes. The dimensions of the vessel are variable depending on the size of the unit or system being produced. For example, a portable unit can be as small as a 2" sphere and can be scaled up to larger sizes depending on desired production outcomes for fuel generation. A benefit of smaller sized vessels is the reduce amount of energy needed from the one or more laser 5 to bring the vessel and contents up to the desired heat spectrum (3000° C.-3990° C.), whereas a larger sized vessel would be able to produce larger quantities of hydrogen fuel but may require a more intensive heating regimen from the one or more lasers.

The spherical vessel 4 would need to be made out of materials capable of withstanding high temperatures and pressures. Tantalum Hafnium Carbide Alloy is a metal capable of withstanding temperatures in excess of 3990° C. and high-pressures as well. This type of metal is commonly used in Aerospace applications such as in the engine cones of rockets and space shuttles, which experience extreme temperatures and pressures. Another material within contemplation of the embodiments is graphite, which is also capable of withstanding temperatures up to 3652° C. before melting. As for the transparent materials used for the window 4a of the spherical vessel 4, such material would ideally resist puncturing or deformation by the one or more lasers. With this in mind, the window 4a can be made of either fused silica glass or aluminum silicate glass (both of which are used in the aerospace industry, specifically for windows on space shuttles that need to resist the extreme temperatures and pressures of reentry though planetary atmospheres), or various transparent ceramics (many of which are used for making the lens that is used in lasers). Obviously, such materials should have thermal properties exceeding the maximal contemplated temperatures applied the contents of the spherical vessel 4.

In some embodiments, the system 10 or 20 may include a service panel box that will possess varying components specific to the requirements of the high-pressure water pump 2 and specific to the electric supply requirements of computer system 101 that is used to operate and regulate the vessel, storage tanks, laser, alignment system, thermostat and other components of the system 10 or 20. These components include but are not limited to varying amperage breakers, resistors, voltage regulators, and the like.

In some embodiments the high-pressure water pump 2 will vary in PSI depending on the requirements of the size of the thermolysis Hydrogen/Oxygen generator.

In some embodiments the water supply 1 can be supplied in numerous ways. For example, methods of water supply include but are not limited to a holding tank, public provided water, natural sources of water such as rivers, creeks, lakes, ponds, or oceans.

In some embodiments the check valve 3 may need to be of different PSI ratings depending on the size of the water pump 2 and the pressure that that is required of high pressure, high temperature spherical vessel 4 or boiler tank.

In some embodiments, having at least one or more lasers 5 for the intention of producing a minimum temperature of 3000 degrees Celsius and not exceeding the tolerances of the high pressure/high temperature spherical vessel. The lasers can come in the form of, but are not limited to, fiber lasers, solid state lasers, semiconductor lasers, liquid lasers, or gas lasers as long as carbon is not used or produced by the laser process.

In some embodiments the spherical vessel or boiler tank 4 is manufactured from a high temperature/high pressure material such as Tantalum Hafnium Carbide Alloy and/or Graphite and/or includes at least a portion formed from transparent material or glass where the one or more lasers are focused toward the portion formed from transparent material to create heat in excess of 3000 degrees Celsius and convert liquid water in the spherical vessel or boiler tank 4 to its separate gasses (hydrogen and oxygen).

In some embodiments of the Thermolysis hydrogen/oxygen generator is portable and self contained while in other embodiments the system can be fixed. In some embodiments, the Thermolysis hydrogen/oxygen generator further includes a check valve 3 coupled between the pump 2 and boiler tank 4 while in other embodiments the check valve 3 or an excessive steam release valve 4b as shown in FIG. 1 can be included as part of the boiler tank 4. In some embodiments, the boiler tank 4 includes a window or portion 4a made of glass or transparent material and further includes a metal heat exchange rod 4c within the boiler tank that lines up to a focal point of the laser to provide a heat generation surface at or through the transparent portion 4a and thereby further enhance efficiency.

In some embodiments, the boiler tank spherical vessel 4 includes a divider 13 and further includes a cathode 12 for attracting the hydrogen gasses, and an anode 14 for attracting the oxygen gasses within the boiler tank or vessel 4, thereby further enhancing efficiency. In some embodiments, the anode and cathode can be located either outside or inside of the spherical vessel 4. The shape of the anode 14 and cathode 12 can be cylindrical, but other shapes are contemplated. In some embodiments, the anode 14 can be made of zinc, lithium, graphite, or platinum and the cathode 12 can be made of an aluminum substrate, active material, conductive additive, and binder.

In some embodiments the system can further include a rigid and pivotable framework 11 as shown in FIG. 1 to couple or move the spherical vessel 4 relative to the one or more lasers 5 enabling the spherical vessel 4 and at least one laser 5 to adjust to a focal point to maximize the efficiency of the one or more lasers 5.

Figure 4:
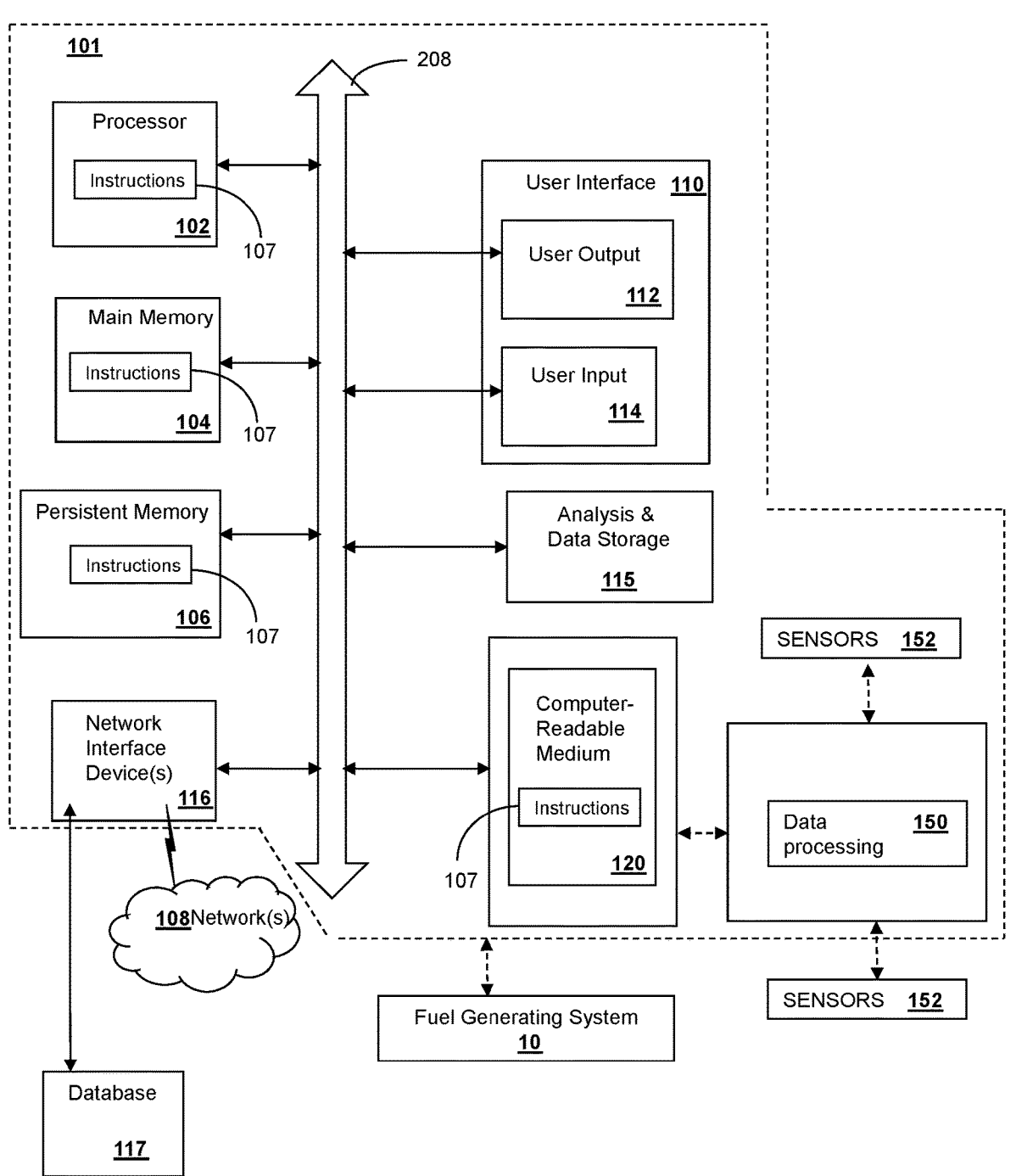
FIG. 4 is a block diagram of a system including a processing system in accordance with the embodiments.

In some embodiments, the Thermolysis hydrogen/oxygen generator 10 or 20 further includes a one or more processors 101 as shown in FIG. 1 or 4 coupled to a thermostat 9 to control movement of the of the one or more lasers 5 or vessel 4 so as to regulate the distance between the one or more lasers 5 and the vessel 4, thereby regulating the temperature of the fluid in the vessel 4.

The various embodiments provide a flexible and environmentally friendly hydrogen manufacturing system. In various embodiments, the system can include a tank with liquid 1, a pump 2, a check valve 3 and a boiler 4, where the boiler 4 has heat applied to it by a power source formed of one or more lasers 5 directed towards the boiler 4 and where the liquid converts to gas to be stored (in storage tanks 6, 7) for the purpose of harvest and usage.

In some embodiments, hydrogen being lighter in weight than oxygen will rise to the top of the high-pressure high temperature vessel 4 and will enter into the hydrogen storage tank 6. Since oxygen is heavier in weight than hydrogen, it will not be able to rise to the top of the vessel 4 and therefore can be directed into a separate storage tank 7 specific to oxygen. Once separated into the storage tanks, the gasses can be harvested for the utilization of carbon free fuel.

The system can further include a processor 101 coupled to one or more devices or sensors within the system to enable a more efficient and safe operation. The processor and sensors can be coupled wirelessly or wired to the various components in the system for guidance and control and/or monitoring. For example, the processor can be coupled to the pump 2, the check valve 3, and the one or more 5 (or 5a, 5b, and 5c), or other devices to efficiently assist in turning on, off, or redirect components as needed. In one embodiment, the processor and rotation and/or tilt or orientation device (11) can turn or tilt or re-orient the one or more lasers 5 for maximum efficiency.

Figure 3:
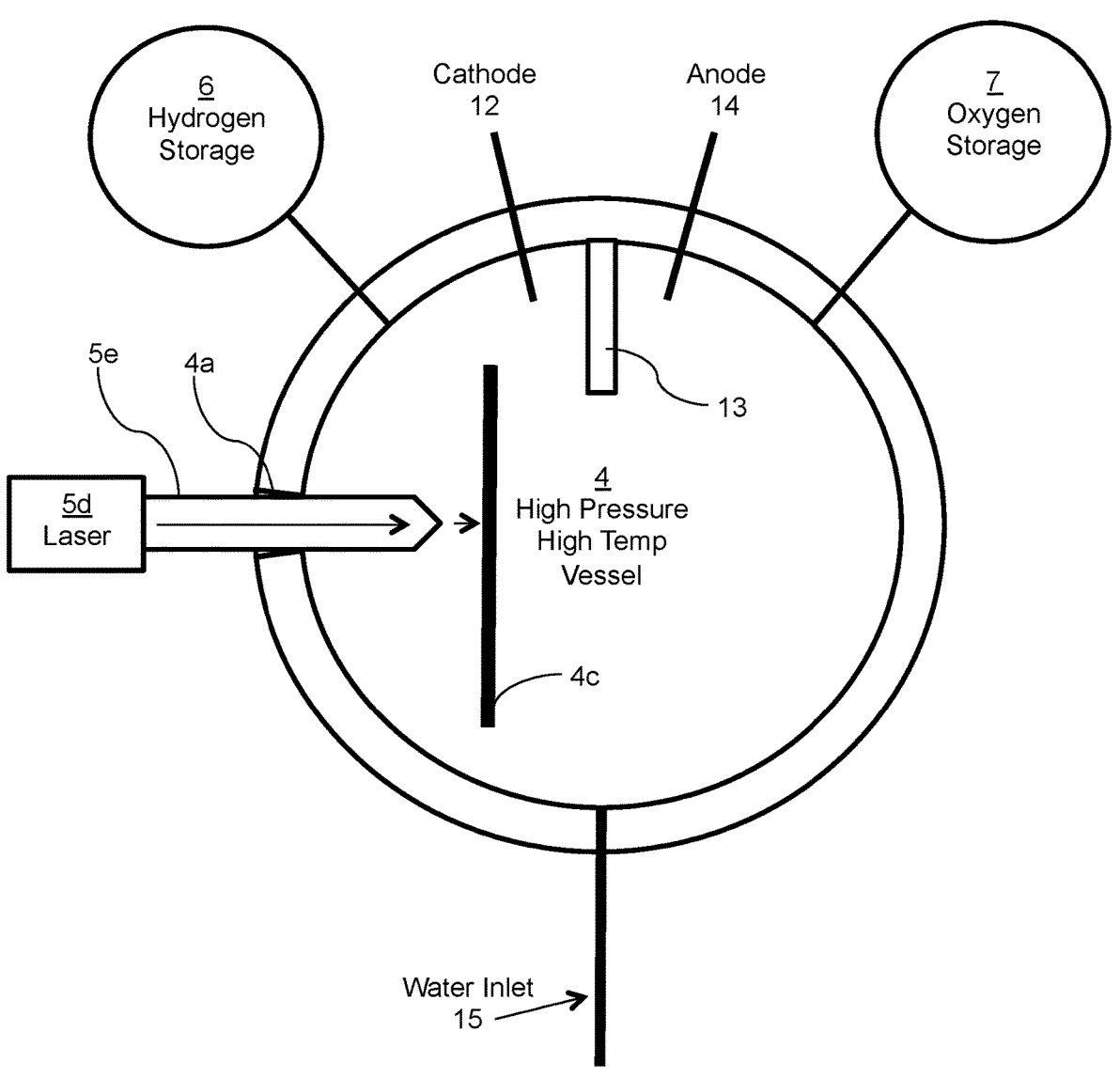
FIG. 3 yet another system for generating power using at least in part a thermolysis generator in accordance with the embodiments.

In some embodiments as shown in a system 25 of FIG. 3, a laser 5d can be fed through a probe 5e that goes into the vessel 4 so as not to need to worry about using glass or something that can deform. The system 25 can be similar in many respect to the systems 10 and 20 previously described including the vessel 4, hydrogen storage tank 6, oxygen storage tank 7, cathode 12, anode 14, divider 13, heat exchange rod 4c and water inlet 15. As previously noted, there are various options for lasers including fiber lasers, solid state lasers, semiconductor lasers, liquid lasers, or gas lasers, so there are options that can lend themselves to compatibility with the intended vessel.

In some embodiments, the Thermolysis hydrogen/oxygen generator further includes a check valve 3 coupled between pump 2 and the boiler tank 4 while in other embodiments the check valve 3 or an excessive steam valve 4b (as shown in FIG. 1) can be included as part of the boiler tank 4. The excessive steam release valve 4b can be used to avoid excessive pressure build up within the boiler tank 4 and to avoid possible explosion of the boiler tank 4. In some embodiments as noted above, the boiler tank 4 includes a portion made of glass and/or other transparent substances capable of sustaining high heat and pressure and can further include a metal heat exchange rod 4c within the boiler tank 4 that lines up to a focal point of the one or more lasers 5 so as to provide a heat generation surface at or through the portion made of glass and/or other transparent substances capable of sustaining high heat and pressure and thereby further enhancing efficiency. For simplicity, a single laser 5 is shown, but the embodiments herein contemplate the use of one or more lasers 5 being oriented or directed so that the focal point of the laser beams point to the boiler tank 4, the transparent window, and/or the heat exchange rod. The orientation of the one or more lasers 5 can be done selectively and/or programmatically. In some embodiments, the focal point of all laser beams can be to a single point within the boiler tank, or to multiple focal points within the boiler tank, or to a single point on the heat exchange rod 4c or to multiple points on the heat exchange rod. As the one or more lasers 5 can move relative to the vessel 4 in certain embodiments, it may be desirable to move (or scan) the laser or lasers relative to the vessel (or the heat exchange rod within the vessel) to obtain an optimum temperature and pressure.

In some embodiments, the level of efficiency for the system is variable depending on the size of the unit that is being manufactured. In general, the minimum target temperature is around 3000° C., as this temperature will provide a greater than 50% efficiency in converting water to hydrogen gas. From that point the efficiency improves as the temperature increases, however, the system obviously should not exceed the maximum temperature that the vessel can withstand before its integrity is compromised (typically around 3990° C.).

In some embodiments the system can further include a rigid and pivotable framework to coup or orient the boiler tank 4 toward the one or more laser/s 5 enabling the boiler tank 4 and at least one laser 5 to stay on a designated point on the boiler tank 4.

In some embodiments, the thermolysis hydrogen/oxygen generator further comprises an aligning system 11 that rotates or orients the one or more lasers 5 so as to ensure maximal utilization of heat being generated. In some embodiments, the system includes a transparent window formed on a portion of the boiler tank 4 which can include a translucent metal material. The vessel 4 can further include a heat exchange rod within the vessel 4 that lines up at a point through the transparent window to the focal point of the laser 5 so as to provide a heat generation surface within the vessel 4 or right at the surface of the vessel, thereby further enhancing efficiency.

Utilizing a laser or lasers to heat the contents of the vessel will be effective as lasers can produce a wide range of heat depending on the specifications of the laser. In some embodiments, the system can include a "heat bar" (heat exchange rod), an aligning system that orients the laser or lasers to ensure maximal utilization of heat, and a pivotal framework that can orient the tank towards one or more laser or lasers. A stir mechanism within the vessel 4 would not be necessary in most contemplated embodiments as convection currents within the vessel will occur as the contents would be in a gaseous state.

Having a single focal point is not critical. In some embodiments, there will be a framework, aligning systems, and sensors to monitor temperature. Such arrangement will allow the ability for the laser to "scan" or move to necessary locations to maximize heat control of the contents within the vessel.

In some embodiments, the system further includes one or more processors 101 coupled to a thermostat to control movement of the one or more lasers 5 so as to regulate the distance between the one or more lasers 5 and the vessel 4, thereby regulating the temperature of the fluid in the vessel 4.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. As noted previously, the data processing can be any number of data processing techniques suited for the generating of fuels as contemplated herein in a manner that can be controlled.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

As shown in FIG. 4, an information processing system 101 of a system 200 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 200. The data processing module 150 can be coupled to one or more sensors 152 as needed. Such sensors can be thermostats, temperature sensors, orientation sensors, rotation sensors, pressure sensors, location sensors, motion sensors, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Some sensors 152 can be part of the processor 101 itself or operatively coupled to the sensors 152. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 200, can use the information from the history log such as in the analysis process and in making decisions related to generating fuels according to a database of best practices for a particular procedure or procedures.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 200 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-3 and 5 illustrate examples of systems (10), methods (50) or process flows, according to various embodiments of the present disclosure, which can operate in conjunction with the information processing system 200 of FIG. 4.

In some embodiments, a thermolysis based hydrogen and oxygen generation method 50 as illustrated by the flow chart of FIG. 5 can include the step 51 of supplying fluid (such as water) into a high pressure, high temperature spherical vessel, where the fluid provided is for separating into at least hydrogen molecules and oxygen molecules, applying at 53 a focused energy using one or more lasers to the fluid within the spherical vessel, separating at 55 the hydrogen molecules and the oxygen molecules, storing the hydrogen molecules in a hydrogen storage tank at 56, and storing the oxygen molecules in an oxygen storage tank at 57.

In some embodiments, the thermolysis based hydrogen and oxygen generation method includes supplying at 52 the fluid into the spherical vessel by pumping water into the spherical vessel using a high pressure water pump.

In some embodiments, the thermolysis based hydrogen and oxygen generation method further includes the step 54 of powering the one or more lasers with an environmentally friendly power source selected from solar power, wind power, or hydroelectric power.

In some embodiments, the thermolysis based hydrogen and oxygen generation method separates the hydrogen molecules and the oxygen molecules by raising the temperature in the spherical vessel in a range of 3000 to 3990 degrees Celsius by using the one or more lasers, applying a cathode in or at a portion of the spherical vessel to attract hydrogen molecules towards the hydrogen storage tank, and applying an anode in or at a different portion of the spherical vessel to attract oxygen molecules towards the oxygen storage tank as shown in step 55.

In some embodiments with reference to any of the embodiments, the various components can be arranged and configured to be in any number of parameters, positions and sizes as required for a particular embodiment. Some embodiments with smaller dimensions or parameters would likely be better suited for portable embodiments. For example, in a number of embodiments the laser 5 can be of varying laser forms and intensities, the water supply tank 1 can be from 1 gallon capacity and up, the boiler tank 4 can be 2×2×10 inches and up, or as required.

In interpreting the present disclosure and the claims, references of the form "A and/or B" encompass any and every combination and subcombination of the elements A and B, namely any or all of the following: (i.) A, (ii.) B, (iii.) A or B, and (iv.) A and B. References of the form "A, B, and/or C" likewise encompass any and every combination and subcombination of elements A, B, and C). Where the present disclosure or any of the claims may recite "a" or "a first" item or the equivalent thereof, such disclosure includes one or more such items and does not require or exclude two or more such items. Numerical or ordinal terms such as "first", "second", "third" etc. when used to refer to items are used solely to identify the items, and do not require or limit the number of such items elements and do not indicate, require or limit a particular position or order of such items unless expressly and clearly stated otherwise.

Descriptions made with reference to "embodiment", "embodiments", "some embodiments", "an embodiment", "preferred embodiment", "other embodiments", "alternative embodiments", "various embodiments" or the like mean that the description is applicable to at least one embodiment but not necessarily all embodiments. The terms "comprising", "including", "having", and the like, as used with respect to one or more embodiments, are synonymous. In some cases features, items steps or other subject matter are described herein as being optional or using terms such as "optional" or "optionally". However, lack use of such terms in connection with the description of any other features, items steps or other subject matter does not in any way mean or imply that such other features, items steps or other subject matter are required or are not optional.

As an aid to understanding, various actions, operations or steps may sometimes be presented herein or described herein in sequence. However, the order of the description or written presentation herein is not to be construed to mean or imply that such must necessarily occur in a corresponding order or sequence unless otherwise expressly and clearly stated or logically essential. Some actions, operations or steps may permissibly be performed in an order or sequence other than the order of their description or written presentation herein unless otherwise expressly and clearly stated or logically essential. Unless otherwise expressly and clearly stated or logically essential. Unless otherwise expressly and clearly state or logically essential, actions, operations or steps described herein may be combined or divided. Unless otherwise expressly and clearly stated or logically essential, any description herein of any one or more actions, operations or steps does not preclude any one or more other preceding, succeeding and/or intervening actions, operations or steps irrespective of whether or not such preceding, succeeding and/or intervening actions, operations or steps are described or disclosed herein.

Unless otherwise expressly and clearly stated or logically essential, any illustration, description, or reference herein of any one or more items, structures or elements being "connected to", "coupled to", "joined to", "joined with", "attached to", "mounted to", "mounted in", or "secured to" any one or more other specified items, structures or elements shall not be construed to preclude such connection, coupling, joint, attachment, mounting or securement being either made indirectly, by way of one or more other specified or unspecified items structures or elements, or being made directly.

Unless otherwise expressly and clearly stated or logically essential, any illustration, description, or reference herein of any one or more items, structures, or elements "adjoining", any one or more other specified items, structures or elements, shall be construed to permit that such may adjoin either direct or indirectly. The term "adjoining" permits, but does not require, preclude the presence of items, structures or elements interposed between those describes as adjoining. Unless otherwise expressly and clearly stated or logically essential, any illustration, description, or reference herein to any one or more items, structures or elements being "beneath", "below", "above", "behind", "in front of", "between", "under", "over", "in", "within", "outside", "inside", any one or more other specified items, structures or elements and/or any other prepositions or prepositional phrases shall construed in a manner which permits, but does not require, contact or immediacy and any and all other prepositions and/or prepositional phrases shall be construed in that same manner.

As used herein, the term "material" encompasses, without limitation, unblended materials having a single constituent, blended materials having two or more constituents, composite materials, homogeneous materials and non-homogeneous materials.

While the embodiments have been described with reference to various preferred embodiments, it will be understood by those skilled in the art that various changes may be made and equivalents substituted for elements thereof without departing from the scope of the embodiments and that modifications may be made to adapt to a particular situation or application of the embodiments without departing from the scope. The embodiments within the scope of the claims are not limited to the particular embodiments disclosed. Rather, the claims cover all embodiments which are within the scope of the claims, either literally or under the Doctrine of Equivalents.

The invention claimed is:

1. A thermolysis based hydrogen and oxygen generator, comprising a high pressure water pump for pumping water provided by a water supply;

a check valve coupled to the high pressure water pump;

a high pressure, high temperature spherical vessel coupled to the check valve;

one or more lasers for focusing energy in a predetermined direction towards the spherical vessel, wherein the one or more lasers creates heat energy in the spherical vessel sufficiently to cause water in the spherical vessel to separate into hydrogen molecules and oxygen molecules;

a heat exchange rod within the spherical vessel;

wherein the spherical vessel includes a portion forming a glass window wherein the one or more lasers are focused toward the glass window and the heat exchanger rod to convert water into hydrogen gas and oxygen gas;

a processor coupled to a thermostat to control movement of the one or more lasers so as to regulate a temperature of a fluid in the spherical vessel:

a power supply for powering the one or more lasers;

a hydrogen storage tank coupled to the spherical vessel for storing the hydrogen molecules; and an oxygen storage tank coupled to the spherical vessel for storing the oxygen molecules.

2. The thermolysis based hydrogen and oxygen generator of claim 1, wherein the spherical vessel is a boiler tank that includes a portion formed from one or more of Tantalum Hafnium Carbide Alloy, or Graphite in a form capable of sustaining high temperatures and high pressure.

3. The thermolysis based hydrogen and oxygen generator of claim 1, wherein the spherical vessel is a boiler tank further that includes the heat exchanger rod within the boiler tank and wherein an orientation device coupled to the one or more lasers and turns, tilts, or re-orients the one or more lasers for maximum efficiency.

4. The thermolysis based hydrogen and oxygen generator of claim 1, wherein the Thermolysis hydrogen/oxygen generator is portable and self-contained and wherein the one or more lasers are configured to be selectively and rotatably focused towards the spherical vessel and wherein the one or more lasers are powered by one or more power sources selected from a solar power source, a wind power source, and a hydroelectric power source.

5. The thermolysis based hydrogen and oxygen generator of claim 1, wherein the check valve is configured and constructed to reside between the high pressure water pump and the spherical vessel.

6. The thermolysis based hydrogen and oxygen generator of claim 1, wherein the heat exchanger rod is a metal heat exchange rod within the spherical vessel that lines up to at least one focal point of the one or more lasers so as to provide a heat generation surface at or through the glass portion and thereby further enhancing efficiency, and wherein the spherical vessel further includes a divider member that keeps the hydrogen molecules and oxygen molecules separated so that the hydrogen gas enters the hydrogen storage tank while the oxygen gas is directed into the oxygen storage tank and the spherical vessel further includes a cathode for attracting hydrogen gases and an anode for attracting oxygen gasses.

7. The thermolysis based hydrogen and oxygen generator of claim 1, further comprising an excessive steam release valve for the spherical vessel.

8. The thermolysis based hydrogen and oxygen generator of claim 1, further comprising a rigid and pivotable framework to couple the spherical vessel to the one or more lasers enabling the spherical vessel and the one or more lasers to adjust relative to each other to cause a focal point to stay on a designated point on or within the spherical vessel.

9. The thermolysis based hydrogen and oxygen generator of claim 1, wherein the spherical vessel includes the window made of a translucent material selected from one of a translucent metal, plexiglass, or glass capable of withstanding high heat and pressure.

10. The thermolysis based hydrogen and oxygen generator of claim 1, wherein the spherical vessel includes the window made of a translucent material made of Indium Tin Oxide.

11. The thermolysis based hydrogen and oxygen generator of claim 1, wherein the Thermolysis generator further comprises an alignment system that rotates or orients the one or more lasers to ensure maximal utilization of heat energy generated by the one or more lasers.

12. The thermolysis based hydrogen and oxygen generator of claim 1, wherein the window formed on the portion of the spherical vessel includes a translucent metal material.

13. The thermolysis based hydrogen and oxygen generator of claim 1, wherein the Thermolysis generator further comprises a rigid and pivotable framework to couple or move the spherical vessel relative to the one or more lasers enabling the spherical vessel and the at least one laser to adjust to a focal point on the heat exchanger rod to maximize the efficiency of the one or more lasers.

14. A thermolysis based hydrogen and oxygen generator, comprising:

a high pressure pump for pumping fluid, such fluid provided for separating into at least hydrogen molecules and oxygen molecules;

a high pressure, high temperature spherical vessel coupled to the high pressure pump;

one or more lasers for focusing energy in a predetermined direction towards the spherical vessel, wherein the one or more lasers creates heat energy and pressure in the spherical vessel sufficiently to cause the fluid in the spherical vessel to separate into hydrogen molecules and oxygen molecules;

a heat exchange rod within the spherical vessel;

wherein the spherical vessel includes a portion forming a glass window wherein the one or more lasers are focused toward the glass window and the heat exchanger rod to convert water into the hydrogen molecules and the oxygen molecules;

a processor coupled to a thermostat to control movement of the one or more lasers so as to regulate a temperature of a fluid in the spherical vessel;

a power supply for powering the one or more lasers and the high pressure pump;

a hydrogen storage tank coupled to the spherical vessel for storing the hydrogen molecules; and an oxygen storage tank coupled to the spherical vessel for storing the oxygen molecules.

15. The thermolysis based hydrogen and oxygen generator of claim 14, wherein the glass window comprises a translucent window formed on a portion of the spherical vessel and the heat exchange rod within the spherical vessel lines up through the translucent window to the focal point of the one or more lasers so as to provide a heat generation surface on the heat exchange rod.

16. The thermolysis based hydrogen and oxygen generator of claim 14, further comprising a rigid and pivotable framework to couple or move the spherical vessel relative to the one or more lasers enabling the spherical vessel and the one or more lasers to adjust relative to each other to cause a focal point to stay on a designated point on or within the spherical vessel.

17. A thermolysis based hydrogen and oxygen generation method, comprising:

supplying fluid into a high pressure, high temperature spherical vessel by a high pressure water pump for pumping water provided by a water supply, wherein the fluid provided is for separating into at least hydrogen molecules and oxygen molecules, wherein the spherical vessel and high pressure water pump are coupled to a check valve, wherein the spherical vessel includes a portion forming a glass window wherein one or more lasers are focused toward the glass window and a heat exchanger rod is within the spherical vessel to convert the water into hydrogen gas and oxygen gas;

applying a focused energy using the one or more lasers to the fluid within the spherical vessel using a power supply for powering the one or more lasers wherein a processor is coupled to a thermostat to control movement of the one or more lasers so as to regulate a temperature of the fluid in the spheric vessel;

separating the hydrogen molecules and the oxygen mol-
ecules;

storing the hydrogen molecules in a hydrogen storage
tank; and storing the oxygen molecules in an oxygen storage tank. 5

18. The thermolysis based hydrogen and oxygen genera-
tion method of claim 17, further comprising powering the
one or more lasers with an environmentally friendly power
source selected from solar power, wind power, or hydro-
electric power. 10

19. The thermolysis based hydrogen and oxygen genera-
tion method of claim 17, wherein separating the hydrogen
molecules and the oxygen molecules comprises raising the
temperature in the spherical vessel in a range of 3000 to
3990 degrees Celsius using the one or more lasers, applying 15
a cathode in or at a portion of the spherical vessel to attract
hydrogen molecules towards the hydrogen storage tank, and
applying an anode in or at a different portion of the spherical
vessel to attract oxygen molecules towards the oxygen
storage tank. 20

\*   \*   \*   \*   \*